United States Patent
Fant et al.

(10) Patent No.: US 6,957,430 B2
(45) Date of Patent: Oct. 18, 2005

(54) METHOD FOR MANAGING MULTIMEDIA PLATFORM RESOURCES AND MULTIMEDIA PLATFORM FOR IMPLEMENTING IT

(75) Inventors: Walter J. Fant, Los Gatos, CA (US); Gerard Richter, Saint Jeannet (FR); Jean-Yves Solves, Marietta, GA (US)

(73) Assignee: Avaya Technology Corp., Basking Ridge, NJ (US)

( * ) Notice: Subject to any disclaimer, the term of this patent is extended or adjusted under 35 U.S.C. 154(b) by 991 days.

(21) Appl. No.: 09/759,662

(22) Filed: Jan. 12, 2001

(65) Prior Publication Data

US 2001/0032230 A1 Oct. 18, 2001

(30) Foreign Application Priority Data

Jan. 14, 2000 (EP) .............................. 00460002

(51) Int. Cl.[7] ................................ G06F 9/46
(52) U.S. Cl. ................ 718/100; 718/104; 718/102
(58) Field of Search ................. 718/100, 101, 718/102, 103, 104; 709/231, 233, 234, 243; 710/305

(56) References Cited

U.S. PATENT DOCUMENTS

| | | | |
|---|---|---|---|
| 5,633,916 A | 5/1997 | Elrod et al. ............ 379/67 |
| 5,677,905 A | * 10/1997 | Bigham et al. ......... 370/395.21 |
| 5,737,395 A | 4/1998 | Irribarren ................. 379/88 |
| 5,740,384 A | * 4/1998 | Asthana et al. .......... 710/305 |
| 5,761,201 A | 6/1998 | Vaudreuil ................. 370/392 |
| 5,802,058 A | 9/1998 | Harris et al. ............. 370/410 |
| 5,941,953 A | * 8/1999 | Bergmann et al. ....... 709/234 |
| 6,078,942 A | * 6/2000 | Eisler et al. .............. 718/100 |
| 6,725,279 B1 | 4/2004 | Richter et al. |

FOREIGN PATENT DOCUMENTS

| | | | |
|---|---|---|---|
| WO | WO 98 09422 | 3/1998 | |
| WO | WO 98/09422 | 3/1998 | ......... H04M/3/42 |

OTHER PUBLICATIONS

EP Search Report, May 17, 2001, European Patent Office.
EP Examination Report, May 19, 2004, European Patent Office.

* cited by examiner

*Primary Examiner*—Majid Banankhah
(74) *Attorney, Agent, or Firm*—David Volejnicek

(57) ABSTRACT

A method and an apparatus for managing signal-processing resources of a multimedia platform that is designed for applying signal-processing operations to multimedia signals defines multimedia functions each capable of monitoring the operation of a set of multimedia platform signal-processing resources, puts them in contact, adapts the contents of the signal-processing resource set depending on the multimedia signal to be processed, and uses the multimedia functions to apply the signal-processing operations to the multimedia signals.

20 Claims, 7 Drawing Sheets ical field

This invention relates to a method for managing multimedia platform signal-processing resources.

BACKGROUND OF THE INVENTION

Multimedia platforms are systems wherein multimedia applications are implemented; for instance, a unified message-handling application or an interactive voice-server application. A unified message-handling platform refers to a system that allows for recording of various kinds of messages, such as telephone messages, electronic messages or faxes, and then showing them to the recipient in their original form (voice, text, image) or in another form. Among the multimedia services that a unified message-handling platform offers, the following multimedia services can be mentioned by way of example:

1) recording telephone messages;
2) recording electronic messages;
3) listening to telephone messages;
4) listening to electronic messages;
5) printing telephone messages on a fax.

In order to implement such services, the unified message-handling platform comprises various signal-processing resources, in particular resources for connecting the multimedia platform to the telephone network, resources for recording telephone and electronic messages in a storage unit of the platform, resources for playing back recorded messages, resources for converting electronic messages into audio messages, and resources for converting telephone messages into text. Advantageously, the platform also includes resources for compressing messages before they are recorded, as well as echo-cancellation resources. All these signal-processing resources come in the form of software or hardware.

At present, such signal-processing resources are controlled directly by the multimedia platform application. Any modification at the multimedia platform resource level (for instance, adding a resource or replacing a resource by a more recent one) implies the modification of the multimedia platform application layer, i.e., requires the platform application program to be rewritten or supplemented. And yet, due to the constant evolution of hardware in the multimedia field, it is important to have an evolutive multimedia platform, i.e., one that can support any kind of signal-processing resource or transport-protocol addition or modification.

Also, the invention is the product of research conducted in relation to multimedia platforms with a view to improving their evolutionary capabilities.

SUMMARY OF THE INVENTION

For this purpose, the invention is a method for managing the signal-processing resources of a multimedia platform designed for applying signal-processing operations to multimedia signals, characterized in that it comprises the following steps of:

defining multimedia functions each capable of monitoring the operation of a set of signal-processing resources of the multimedia platform, putting them in contact, and adapting the contents of said signal-processing resource set depending on the multimedia signal to be processed, and using said multimedia functions to apply said signal-processing operations to said multimedia signals.

Thus, multimedia functions form an intermediate command level between the application program and the signal-processing resources of the multimedia platform. The step of defining such multimedia functions consists in assembling basic functions that are configured for using resources available on the multimedia platform.

Furthermore, in order to be aware of the signal-processing resources available on the multimedia platform, at first power-on, each signal-processing resource declares itself to a negotiating device of the multimedia platform.

Another aspect of the invention is a multimedia platform for implementing this method for managing signal-processing resources. This multimedia platform comprises a plurality of signal-processing resources, a resource interface wherein operations are defined that enable the control of said signal-processing resources, a resource-management unit for dynamically allocating signal-processing resources depending on the signal-processing operation that is to be accomplished and managing exchanges between signal-processing resources, an application interface wherein said multimedia functions are defined, and an application unit including an application program for applying said multimedia functions.

BRIEF DESCRIPTION OF THE DRAWING

Other features and advantages of the invention will be apparent from reading the following detailed description of an illustrative example of the invention that is made with reference to the accompanying drawing, in which.

DETAILED DESCRIPTION

Figure 1:
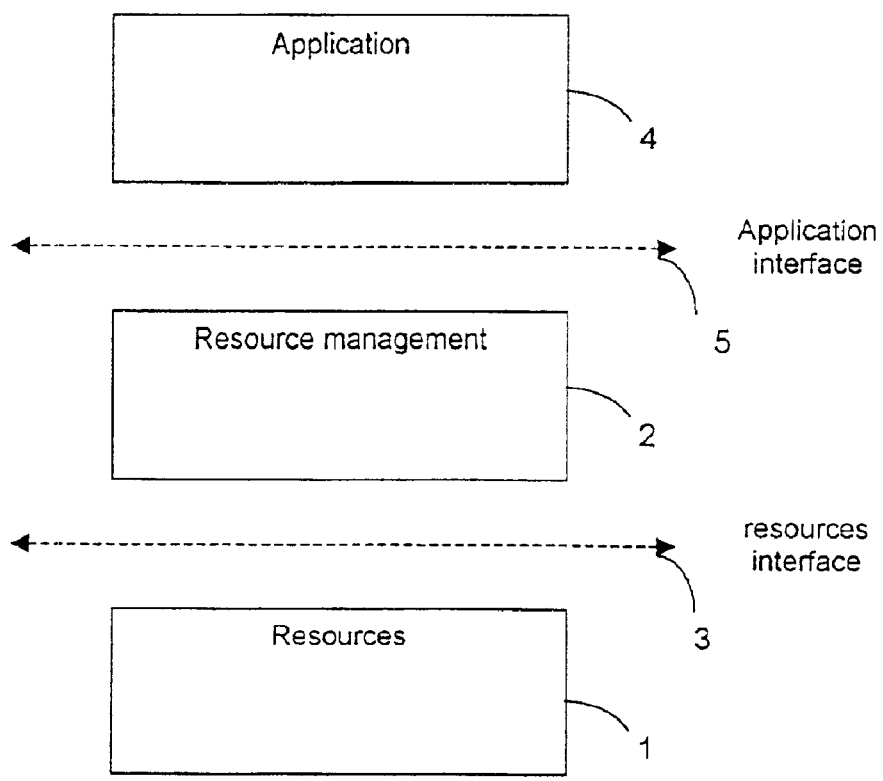
FIG. 1 is a block diagram of a multimedia platform capable of implementing the inventive method.

The organization of a multimedia platform according to the invention is shown in FIG. 1. The multimedia platform can be modeled by three layers communicating with each other through appropriate interfaces. With reference to FIG. 1, the multimedia platform has a first resource layer referenced as resources 1. This layer brings the signal-processing resources of the multimedia platform together. It communicates with a resource management layer 2 via a resource interface 3. The resource management layer 2 is responsible for dynamically allocating the signal-processing resources of the multimedia platform depending on the multimedia service to be accomplished, monitoring their operation, and setting up data exchanges among resources. Finally, resource management layer 2 communicates with an application layer 4 via a high level interface 5 called application interface.

According to the invention, application interface 5 and the application program of multimedia platform application layer 1 remains unchanged when one signal-processing resource of the multimedia platform is replaced by a more efficient one or when adding a signal-processing resource the functionality of which is already known. Of course, if a new signal-processing resource appears on the market, providing a functionality not known at the time that the platform was designed, it would be possible to supplement the application interface if need be.

When a signal-processing resource is added or replaced on the multimedia platform, at first power-up, the latter declares itself automatically to resource management layer 2. Its characteristics are then registered therein.

At the multimedia platform, signal-processing resources are contained in signal-processing blocks. The same block can comprise several signal-processing resources; for instance, an audio message recording device, a device for replaying such messages, and an echo cancellation device. Furthermore, several identical blocks can be arranged on the same multimedia board. The multimedia board then includes a block server which communicates with resource management layer 2 when the resource characteristics of the multimedia board are registered.

Signal-processing resources are classified by types. A non-exhaustive list of possible resource types is given hereafter:

ResSource: data extraction (for instance, message contents or menu information) in a storage unit of the platform;

ResAudioFlowGeneration: generation of a multimedia flow from audio data, for instance resulting from a ResSource type resource;

ResStoring: data (for instance messages) recording in a storage unit of the platform;

ResCallLine: telephone line call;

ResSignalDetection: signal detection (DTMF, . . . );

ResSignalGeneration: signal generation (beeps, . . . );

ResVoiceRecognition: voice recognition;

ResVoiceSynthesis: voice synthesis;

ResFormatConversion: format conversion;

ResEchoCancellation: echo cancellation;

ResCompression: data compression.

For each of these resource types, a set of description parameters representing its functionalities is provided. By way of example, the description parameters of a ResFormatConversion-type resource are InputCoding and OutputCoding, respectively defining the input encoding format accepted by the resource and the output encoding format output thereby. The description parameters of a ResVoiceRecognition-type resource are, for instance, TypeRecognition, SupportedLanguage, lnputcoding, respectively defining the type of voice recognition used (continuous, by keywords, . . . ), the language recognized (French, English, Italian, . . . ), and the accepted input encoding format of the resource.

Each signal-processing resource includes one or more flow entry ports and/or one or more flow exit ports, respectively for receiving and supplying a multimedia flow. For instance, a ResVoiceSynthesis-type resource includes a flow entry point for receiving text format signals and a flow exit point for supplying audio format signals. These flow entry and output ports make it possible to connect signal-processing resources with each other. For instance, if a multimedia flow is to be processed by a resource A and then by a resource B, then the flow exit point of resource A is put in contact with the flow entry point of resource B.

This putting into contact is subject to a negotiation between the flow entry and output ports involved. This negotiation is performed under the control of resource management layer 2. It concerns the encoding format of the signals exchanged and the type of transport used. Negotiation is explained hereafter by means of an example. A resource A with a flow exit point and a resource B with a flow entry point are considered. The flow exit point of resource A is capable of supplying G721 and G723 format signals with a TDM or TCP protocol. The flow entry point of resource B is capable of receiving G729 or G723 format signals with a UDP or TDM protocol. During negotiation, the flow exit point of resource A polls the flow entry point of resource B to identify the encoding formats and the transport types accepted thereby, selects an encoding format and a transport protocol allowing exchanges between the two resources (in this case, G723 format and TDM transport protocol), configures itself according to the selected encoding format and transport protocol, and asks the flow entry point of resource B to take the same configuration. If the flow entry and output ports do not have a common encoding format or transport protocol, an exception request is posted to application layer 1. Without a common encoding format, this exception can be resolved, for instance, by inserting a format converter between the two of them.

Operations enabling the control of the signal-processing resources of the platform are defined in resource interface 3. In particular, this interface defines operations allowing the declaring of resources to resource management layer 2, allocating resources with a view to running a multimedia service, putting two resources in contact if required, and monitoring the operation of resources and exchanges among resources. It should be noted that the instructions allowing the control of the operation of the platform's signal-processing resources must be the same for all resources of the same kind. For instance, two converters performing different format conversions are controlled by the same instructions. The control instructions associated with each resource type are defined once and for all before implementing the multimedia platform.

Figure 2:
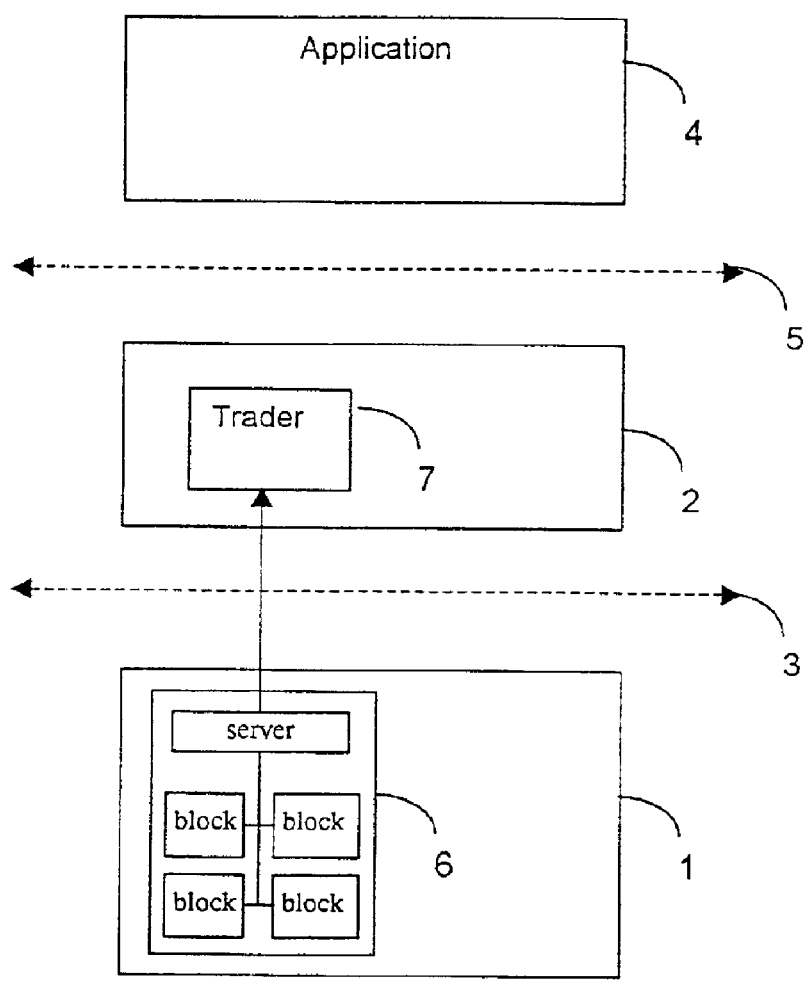
FIG. 2 illustrates an operation of declaring a multimedia board to a negotiating device of a platform according to the diagram of FIG. 1.

As mentioned before, the resources of the multimedia platform declare themselves to resource management layer 2 when they are powered-on for the first time. This declaration step is illustrated by FIG. 2. In this figure, it is considered that resource layer 1 of the multimedia platform includes at least one multimedia board 6 comprising four identical signal-processing blocks and one block server. When the multimedia board 6 is powered-on for the first time, it declares itself to a negotiating device 7 (also called "trader") provided in resource management layer 2. During this declaration phase, the block server of board 6 transmits to negotiation device 7 the list of signal-processing resources contained in multimedia board 6 and the values of their respective description parameters. It also transmits connectivity information thereto, in particular the address of each of the resources and the protocol/network pairs giving access to these resources (for instance TDM/H100, RTP/internet, or AAL1/ATM).

Application layer 4 controls resource management layer 2 via application interface 5, which defines high-level multimedia functions. Each function is to supply a simple control interface for controlling a resource set of the multimedia platform. Most of these functions are generic, i.e., they are directly applicable to all kinds of multimedia signals (audio, video, text).

A non-exhaustive list of high level-functions is given hereafter:

FuncFlowGeneration: Generation of a multimedia flow based on data (message) recorded in a storage unit of the platform;

FuncStoring: data (message) recording in a storage unit of the platform;

FuncNetworkConnection: connection to the telephone network;

FuncVoiceRecognition: voice recognition;

FuncSignalDetection: signal detection.

Figure 3:
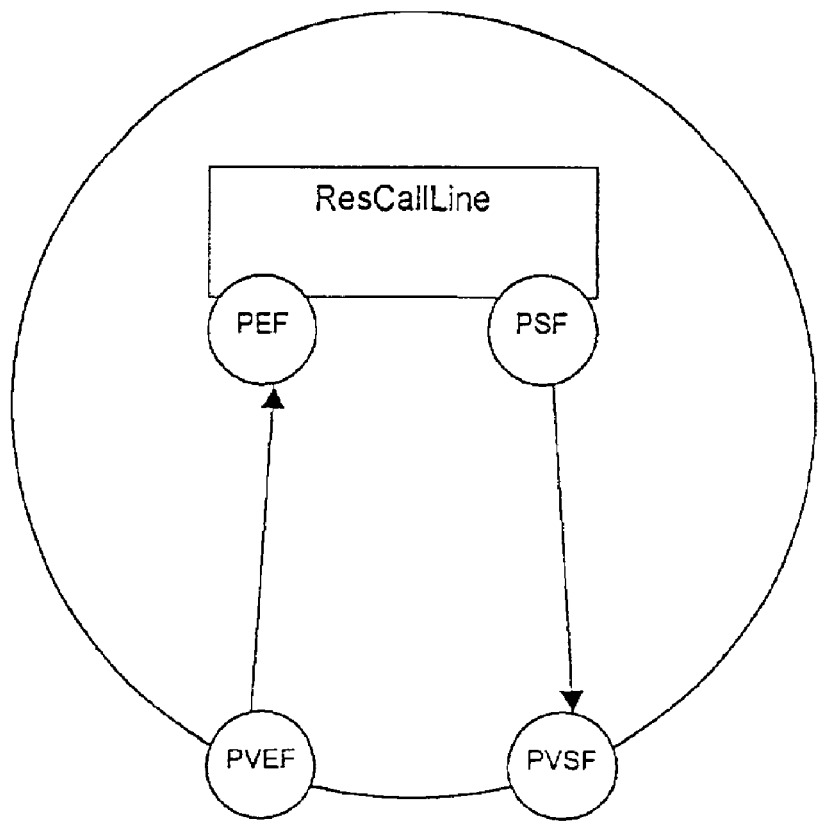
FIG. 3 illustrates a first possible diagram of a FuncNetworkConnection function according to the invention.

The FuncNetworkConnection function is schematically represented in FIG. 3 in its simplest version. It is mainly built upon a ResCallLine-type resource. This resource comes with a flow entry point PEF and a flow exit point PSF through which the data flow comes in and goes out, respectively. The FuncNetworkConnection function has a virtual flow entry point PVEF and a virtual flow exit point PVSF in relation to the flow entry and output points of the ResCallLine-type resource, respectively.

Figure 4:
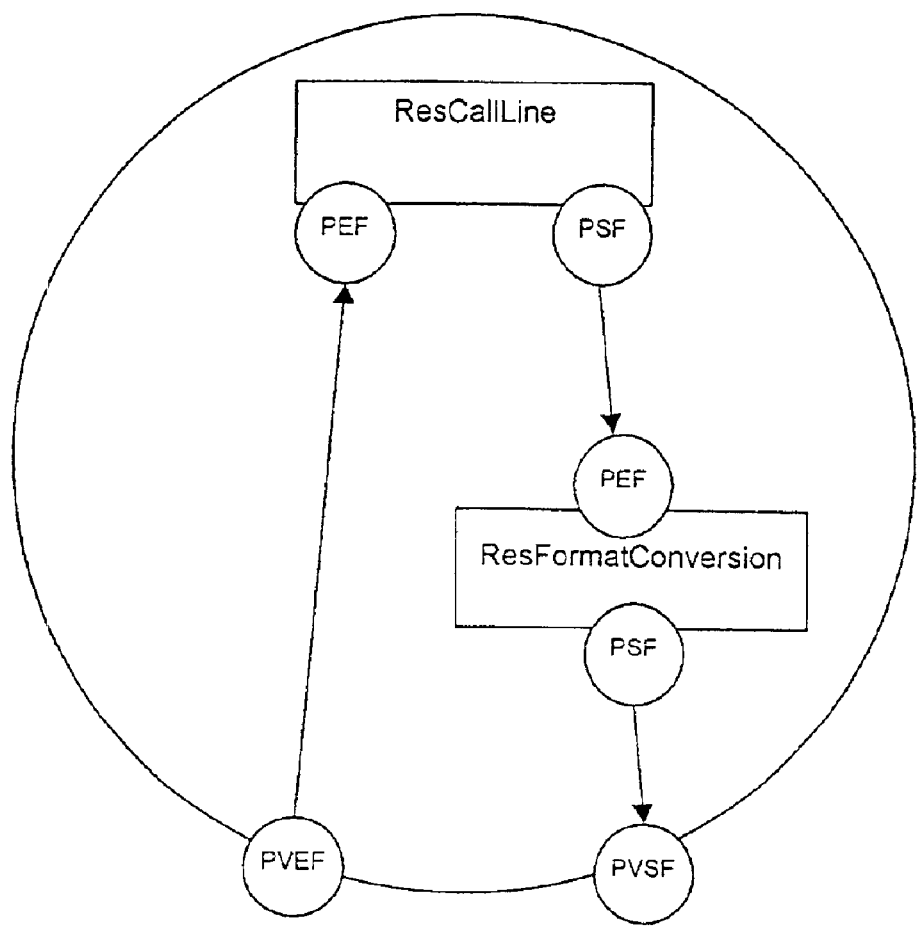
FIG. 4 illustrates a second possible diagram of a FuncNetworkConnection function according to the invention.

This function can be completed by additional resources, for instance, by a ResFormatConversion-type resource when the format of the message from the telephone network must be converted to be processed subsequently by a voice-synthesis device. The ResFormatConversion-type resource is then inserted between the flow exit point PSF of the ResCallLine-type resource and the virtual flow exit point PVSF of the function. This example is illustrated in FIG. 4.

Figure 5:
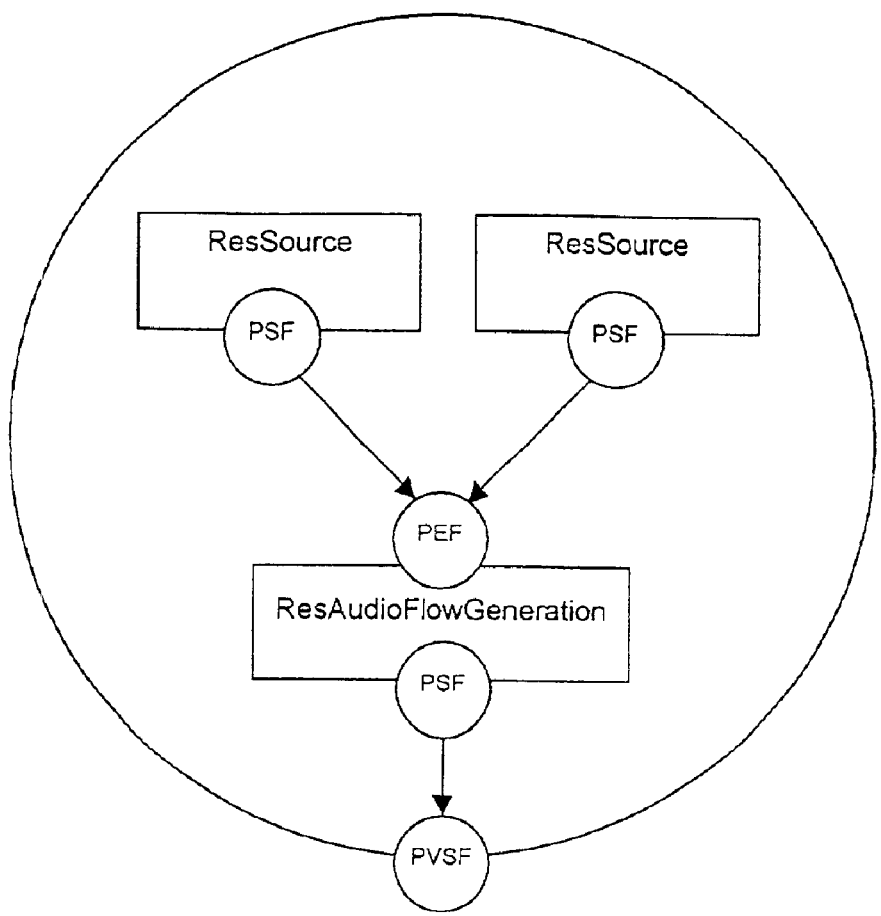
FIG. 5 illustrates a possible diagram of a FuncFlowGeneration function according to the invention.

Another sample function is illustrated in FIG. 5. It involves the FuncFlowGeneration function. This function is built upon three resources: two ResSource-type resources (one storing, for instance, messages, and the other menu information) and one ResAudioFlowGeneration-type resource. The ResAudioFlowGeneration-type resource includes a flow entry point and a flow exit point and the ResSource-type resources each include a flow exit point. The flow exit point of the ResSource-type resources is connected to the flow entry point of the ResAudioFlowGeneration-type resource and the flow exit point of the ResAudioFlowGeneration-type resource is connected to a virtual flow exit point of the FuncFlowGeneration function.

It should be noted that the multimedia functions defined in application interface 5 are basic functions designed for controlling a certain type of resources. These basic functions must be configured at the resource management layer 2 in order to use the signal-processing resources of the multimedia platform involved, i.e., the basic functions are then completed in order to use resources of the multimedia platform that are accessible at given addresses. This configuration is performed when the multimedia platform is installed.

Each function allows for providing the application layer with one high-level control interface. By way of example, the FuncFlowGeneration function is controlled by the following instructions:

Play( )

StopPlay( )

PausePlay( )

Rewind( )

Forward( )

AdjustRate( )

AdjustVolume( )

Execution of one of these high-level instructions is the same as executing a plurality of elementary control instructions for the resources included in the function.

For instance, the control operation rewind( ) can be implemented by the following elementary instructions:

Rewind( ):

AudioFlowGeneration.stop( ): (flow stop)

Source.Setposition( ); (message reset)

AudioFlowGeneration.start( ); (flow generation)

Furthermore, each function is capable of adapting to the application's needs. For instance, if the FuncFlowGeneration function comprises a ResSource-type resource and a ResAudioFlowGeneration-type resource and the message to be processed is a text message to be played back, then the FuncFlowGeneration function is capable of inserting a ResVoiceSynthesis-type resource between the ResSource-type resource and the ResAudioFlowGeneration-type resource in order to convert the text message into an audio message.

When a multimedia service is run, the application uses multimedia functions to control the signal-processing resources of the multimedia platform. Executing an instruction of the platform's application program is explained by means of an example. The instruction play(message 1) is considered, where play( ) is a control instruction of the FuncFlowGeneration function and message 1 is a text message recorded in a memory of the platform. The FuncFlowGeneration function is provided for executing this instruction. Moreover, it is considered that this function is provided for controlling one ResSource-type resource and another one of the ResAudioFlowGeneration-type. When this instruction is executed, the ResSource-type resource first of all reads from the platform's memory the message 1 header, which indicates the message format. The FuncFlowGeneration function realizes that the ResAudioFlowGeneration-type resource is not capable of processing message 1. The FuncFlowGeneration function then asks platform negotiation device 7 for a ResVoiceSynthesis-type resource. If such a resource is available, it is integrated in the FuncFlowGeneration function; otherwise an error message is sent to the application layer. As the FuncFlowGeneration function is completed by the ResVoiceSynthesis-type resource, it is capable of executing the play(message 1) instruction.

Figure 6:
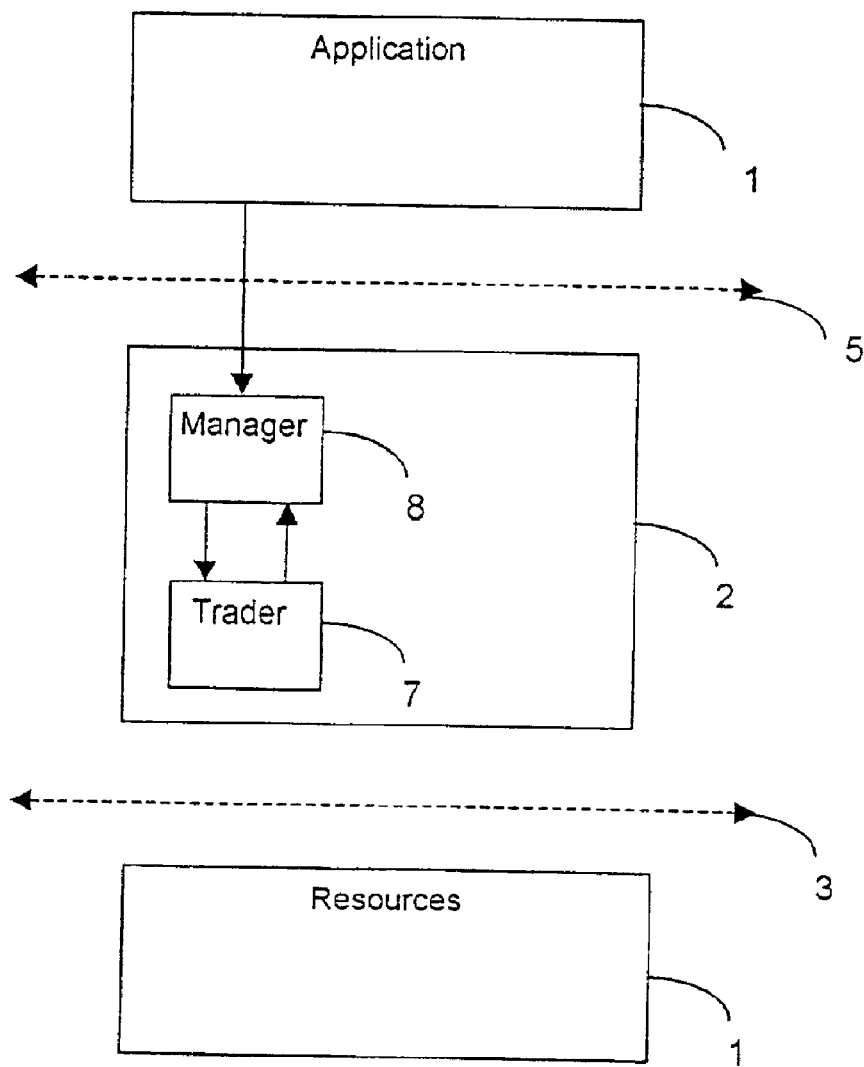
FIG. 6 shows a step of creating a multimedia function group within a platform as shown in FIG. 1.
Figure 7:
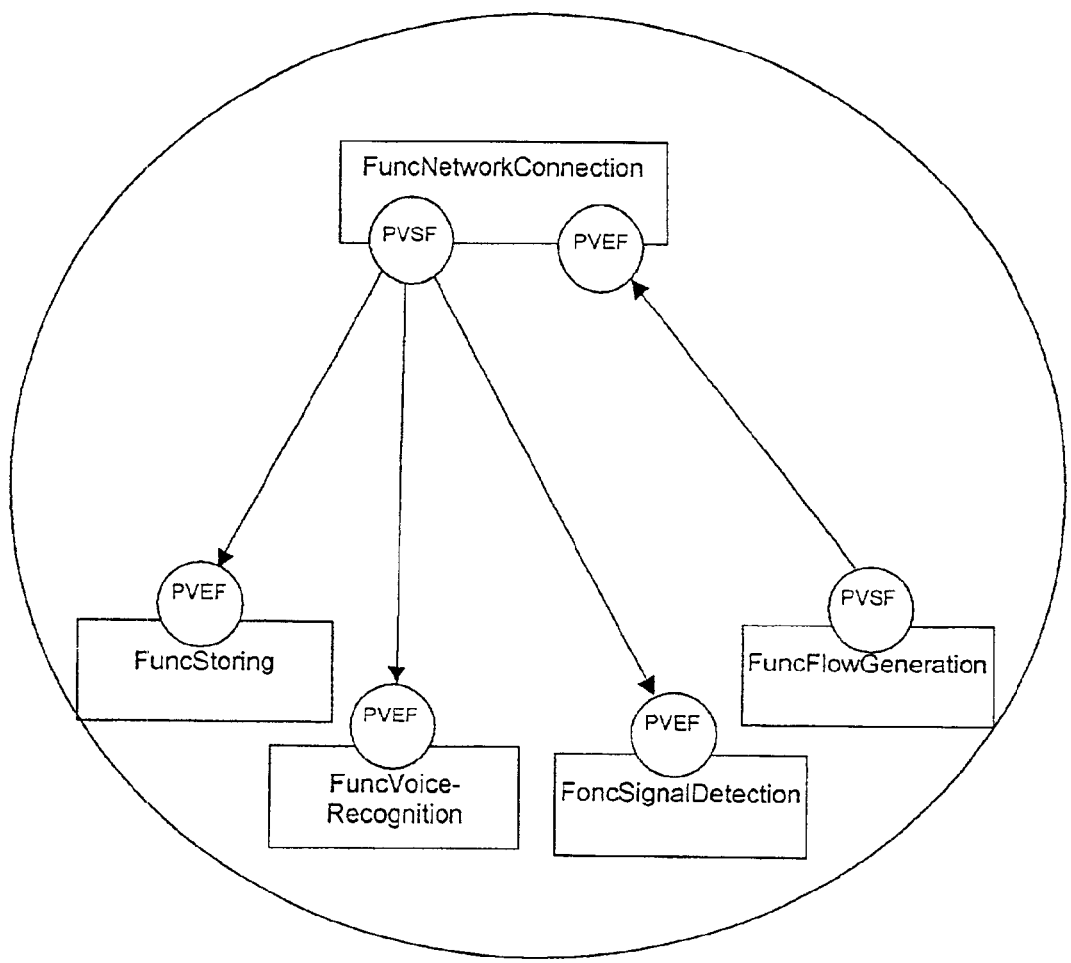
FIG. 7 shows a group of multimedia functions for a voice message handling platform.

Advantageously, when a new application is installed (for instance, one handling voice messages) on the multimedia platform, a group of multimedia functions is formed, wherein this group includes the multimedia functions of the application interface 5 allowing implementation of the multimedia services that are offered by the application of the multimedia platform. The forming of such a group is illustrated in FIG. 6. Firstly, application layer 1 expresses its needs in terms of resources. Then, it turns to a group manager 8 that is provided in resource management layer 2 in order to form a function group suited to the needs of the application. Group manager 8 then polls the negotiation device 7 to find out about the type and address of the signal-processing resources of the multimedia platform. It then configures the multimedia functions of the application interface with the resource addresses that are output by the negotiation device 7. This group manager is also in charge of interconnecting the functions, if required. A function group formed for a voice message handling application is represented in FIG. 7. It includes a FuncNetworkConnection function, the virtual flow entry point of which is connected to the virtual flow exit point of a FuncFlowGeneration function and the virtual flow exit point of which is connected to the virtual flow entry point of 3 functions: FuncStoring, FuncSignalDetection, and FuncVoiceRecognition.

The forming of such a group allows for globally managing a set of signal-processing resources. Such a group can, for instance, be provided for deallocating all signal-processing resources after a multimedia service was run in order to make them available, instead of asking each multimedia function to do so.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method of managing signal-processing resources of a multimedia platform that is designed for applying signal-processing operations to multimedia signals, comprising:

defining multimedia functions each capable of monitoring the operation of a set of multimedia platform signal-processing resources, putting them in contact, and adapting the contents of said signal-processing resource set depending on the multimedia signal to be processed; and using said multimedia functions to apply said signal-processing operations to said multimedia signals, wherein said using comprises:

the signal processing resources of a plurality of types declaring themselves to a resource management function;

the resource management function registering values of description parameters of the declared resources that represent functions of the declared resources, and connectivity of the declared resources including addresses of the declared resources;

configuring the multimedia functions to use certain types of the signal processing resources;

an application issuing a high-level instruction to apply a multimedia function of the multimedia functions to the multimedia signals;

the multimedia function that corresponds to the high-level instruction executing the high-level instruction by issuing a plurality of elementary control instructions that define operations enabling control of the signal processing resources, including dynamically allocating available ones of the signal processing resources of the configured types that are needed to effect the high-level instruction, adapting the multimedia function to the high-level instruction, and setting up data exchanges among the allocated resources.

2. The method of claim 1 wherein:

prior to applying any signal-processing operations to multimedia signals, a multimedia function group is formed, wherein this group includes all multimedia functions required for processing multimedia signals in a given application.

3. The method of claim 1 wherein:

defining multimedia functions comprises assembling basic functions that are configured for using the resources that are available on the multimedia platform.

4. The method of claim 3 wherein:

prior to applying any signal-processing operations to multimedia signals, a multimedia function group is formed, wherein this group includes all multimedia functions required for processing multimedia signals in a given application.

5. The method of claim 3 wherein:

each signal-processing resource of the multimedia platform belongs to one of the types of resources, and the signal-processing resources of a same type are controlled by the same elementary control instructions.

6. The method of claim 5 wherein:

prior to applying any signal-processing operations to multimedia signals, a multimedia function group is formed, wherein this group includes all multimedia functions required for processing multimedia signals in a given application.

7. The method of claim 3, wherein:

said declaring comprises declaring the resources that are available on the multimedia platform to a negotiation device of the multimedia platform when they are powered-on for a first time.

8. The method of claim 7 wherein:

prior to applying any signal-processing operations to multimedia signals, a multimedia function group is formed, wherein this group includes all multimedia functions required for processing multimedia signals in a given application.

9. The method of claim 7 wherein:

each signal-processing resource of the multimedia platform belongs to one of the types of resources, and the signal-processing resources of a same type are controlled by the same elementary control instructions.

10. The method of claim 9 wherein:

prior to applying any signal-processing operations to multimedia signals, a multimedia function group is formed, wherein this group includes all multimedia functions required for processing multimedia signals in a given application.

11. The method of claim 1 wherein:

configuring the multimedia functions comprises configuring the multimedia functions to use signal processing resources that are accessible at given addresses; and dynamically allocating available ones of the signal processing resources of the configured types comprises dynamically allocating available ones of the signal processing resources of the types with whose addresses the multimedia function is configured.

12. The method of claim 1 wherein:

setting up data exchanges among the allocated resources comprises putting the allocated resources into contact with each other by negotiating between flow entry ports and flow output ports of the allocated resources to configure the ports for connecting with each other.

13. The method of claim 1 wherein:

adapting the multimedia function to the high-level instruction comprises if needed, requesting from the resource management function available ones of other types of the signal processing resources that are needed to effect the high-level instruction, and integrating among the allocated resources the requested resources of the other types.

14. The method of claim 1 further comprising:

an application program expressing its needs in terms of resources;

the resource management function responding to the expressed need by forming a group of the multimedia functions that provide to the application program a control interface comprising high-level instructions for controlling the needed resources; and the resource management function allocating the needed resources to the group of multimedia functions by configuring the multimedia functions of the group with addresses of the types of the needed resources.

15. An apparatus for managing signal-processing resources of a multimedia platform that is designed for applying signal-processing operations to multimedia signals, comprising:

means for defining multimedia functions each capable of monitoring the operation of a set of multimedia platform signal-processing resources, putting them in contact, and adapting the contents of said signal-processing resource set depending on the multimedia signal to be processed; and means for using said multimedia functions to apply said signal-processing operations to said multimedia signals, wherein said means for using comprise:

a resource management function, responsive to the signal processing resources of a plurality of types declaring themselves to the resource management function, for registering values of description parameters of the declared resources that represent functions of the declared resources, and connectivity of the declared resources including addresses of the declared resources, and further for configuring the multimedia functions to use certain types of the signal processing resources; and a multimedia function corresponding to a high-level instruction, responsive to an application issuing the high-level instruction to apply a multimedia function of the multimedia functions to the multimedia signals, for executing the high-level instruction by issuing a plurality of elementary control instructions that define operations enabling control of the signal processing resources, including dynamically allocating available ones of the signal processing resources of the configured types that are needed to effect the high-level instruction, adapting the multimedia function to the high-level instruction, and setting up data exchanges among the allocated resources.

16. The apparatus of claim 15 comprising:

a resource interface wherein operations are defined that make it possible to control said signal processing resources;

a resource management unit for dynamically allocating signal processing resources depending on the signal processing operation to be carried out and managing exchanges among signal processing resources;

an application interface wherein said multimedia functions are defined; and an application unit having an application program for applying said multimedia functions.

17. The apparatus of claim 15 wherein:

the resource management function configures the multimedia functions to use signal processing resources that are accessible at given addresses; and the multimedia function dynamically allocates available ones of the signal processing resources of the types with whose addresses the multimedia function is configured.

18. The apparatus of claim 15 wherein:

the multimedia function puts the allocated resources into contact with each other by negotiating between flow entry ports and flow output ports of the allocated resources to configure the ports for connecting with each other.

19. The apparatus of claim 15 wherein:

the resource management function responds to an application program expressing its needs in terms of resources by forming a group of the multimedia functions that provide to the application program a control interface comprising high-level instructions for controlling the needed resources, and allocates the needed resources to the group of multimedia functions by configuring the multimedia functions of the group with addresses of the types of the needed resources.

20. A multimedia platform for defining multimedia functions each capable of monitoring the operation of a set of multimedia platform signal-processing resources, putting them in contact, adapting said signal-processing resource set to a multimedia signal to be processed, and using said multimedia functions to apply signal-processing operations to said multimedia signals, comprising:

a plurality of the signal-processing resources, a resource interface defining operations for controlling said signal-processing resources;

a resource management unit for dynamically allocating signal-processing resources depending on the signal-processing operation to be carried out and managing exchanges among signal-processing resources, including a resource management function. responsive to the signal processing resources of a plurality of types declaring themselves to the resource management function, for registering values of description parameters of the declared resources that represent functions of the declared resources, and connectivity of the declared resources including addresses of the declared resources, and further for configuring the multimedia functions to use certain types of the signal processing resources;

an application interface wherein said multimedia functions are defined; and an application unit having an application program for applying said multimedia functions, including a multimedia function corresponding to a high-level instruction. responsive to the application program issuing the high-level instruction to apply a multimedia function of the multimedia functions to the multimedia signals, for executing the high-level instruction by issuing a plurality of elementary control instructions that define operations enabling control of the signal processing resources, including dynamically allocating available ones of the signal processing resources of the configured types that are needed to effect the high-level instruction, adapting the multimedia function to the high-level instruction, and setting up data exchanges among the allocated resources.

* * * * *